Oct. 23, 1956 V. F. DE VOST ET AL 2,767,573
DROP SHOCK TESTER
Filed Nov. 24, 1954

FIG.5. 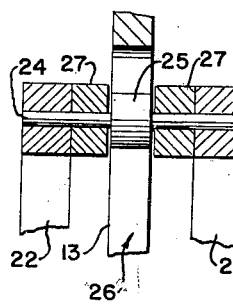 FIG.4. 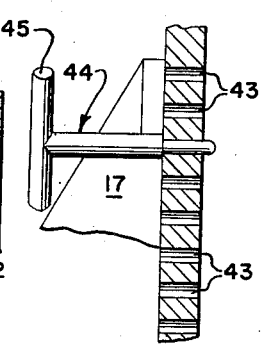
FIG.3.
INVENTORS
V. F. DEVOST
M. KORNHAUSER
BY
ATTORNEYS

United States Patent Office 2,767,573
Patented Oct. 23, 1956

2,767,573
DROP SHOCK TESTER

Valmore F. De Vost, Washington, D. C., and Murray Kornhauser, Hyattsville, Md.

Application November 24, 1954, Serial No. 471,129

4 Claims. (Cl. 73—12)

(Granted under Title 35, U. S. Code (1952), sec. 266)

The invention described herein may be manufactured and used by or for the Government of the United States of America for governmental purposes without the payment of any royalties thereon or therefor.

This invention relates to shock testing machines particularly of the type known in the art as a drop shock tester. More specifically, the invention provides a new and improved drop tester employing the force of gravity for operation and in which a shock of predetermined character is applied to the object to be tested by a linkage arrangement which is effective to arrest the downward movement of the carriage at the end of the downward stroke thereof by applying a predetermined decelerating force thereto by curvilinear motion of the linkage, which force is sufficient to transfer a large portion but not all of the kinetic energy of the moving parts from a downward to an upward movement whereby the carriage rebounds and ascends vertically to a locked position corresponding to the force applied to the object under test as will more clearly appear as the description proceeds.

In devices of this character heretofore devised, it has been the usual practice to employ air guns, dashpots, sand bags, resilient stopping means composed of rubber or any of the synthetic varieties thereof suitable for the purpose, resilient springs and the like to arrest the object under test and the supporting means therefor. Such devices have not been altogether satisfactory in service for the reason that such machines are usually too bulky to be portable, involve considerable complexity in construction and vary in accuracy in the results achieved by reason of variations in the deceleration force applied to the carriage and the object under test during different test operations.

The device of the instant invention possesses all of the advantages of the prior art devices and none of the foregoing disadvantages. In accordance with a preferred embodiment of the invention, the object to be tested is secured to a platform which drops from an initial locked position through a pretermined distance, the platform being arrested at the end of its downward movement by a plurality of arms pivotally secured thereto, the outer ends of which ride in a pair of articulated tracks formed within each of the vertical supports of the tester respectively. Pivotal movement of the arms about the axes of support therewith with the carriage as the carriage reaches the lower portion of its travel, is employed to decelerate, arrest and reverse the direction of movement of the carriage which now rises to a position at the extreme limit of its upward movement corresponding to the force to be measured, the carriage thereafter remaining locked in this position.

One of the objects of the present invention is to provide a new and improved drop testing machine in which the decelerating force at the end of the drop is applied by pivoted arms riding in articulated slots formed in the uprights of the machine.

Another object is to provide a new and improved drop tester having no resilient parts.

A still further object is to provide a drop tester having no resilient parts in which the test carriage is arrested by pivoted arms riding in articulated slots of such configuration as to preserve most but not all of the kinetic energy of the object under test an the carriage whereby the carriage rises to a locked position indicative of the force applied thereto at the end of the drop.

Other objects and many of the attendant advantages of this invention will be readily appreciated as the same becomes better understood by reference to the following detailed description when considered in connection with the accompanying drawing wherein:

Fig. 3 is a view somewhat enlarged and partially broken away of the device taken along line 3—3 of Fig. 2;

Fig. 4 is an enlarged view partly in section of the means for releasably locking the carriage in an initial position; and Fig. 5 is an enlarged fragmentary view of the roller arrangement of the supporting arm taken along line 5—5 of Fig. 1.

Figure 1:
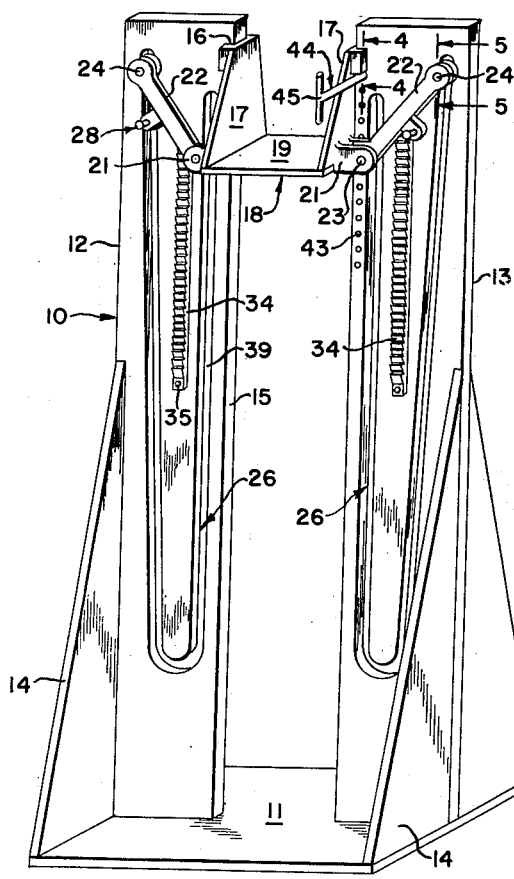
Fig. 1 is a view in perspective of the device of the present invention in accordance with a preferred embodiment thereof with the parts in position at the start of the test.

Referring now to the drawings for a more complete description of the invention and more particularly to Fig. 1 thereof there is shown thereon a drop tester indicated generally by the numeral 10 comprising a base 11 having a pair of vertical supports 12 and 13 secured thereto in any suitable manner as by welding the parts together and braced in a vertical position as by the brace members 14. Each of the supports 12 and 13 is provided with a smooth bearing surface 15 adapted to receive complementary bearing portions 16 formed on the vertical walls 17 of the carriage indicated generally by the numeral 18. The carriage comprises a platform member 19 secured to the wall 17 or, if desired, formed integrally therewith adapted to receive and support the object under test. The walls 17 are each provided with a pair of ears or lugs 21 projecting therefrom to which are pivotally secured a plurality of supporting arms 22 as by a pin or shaft 23. The other end of each of the arms is provided with a pin or shaft 24 upon which is mounted a roller 25 disposed for movement within a bifurcated groove or track 26 formed within each of the vertical supports 12 and 13, a pair of spacing members 27 of greater outside diameter than the width of the groove 26 being carried by the shaft 24 intermediate each of the arms 22 and the vertical support thereby to maintain the roller within the groove 26.

Each of the arms 22 on the front of the machine is provided with a detent 28 comprising a plunger 29 slidably arranged within a recess 31 formed within each of the arms 22 and 23 and prevented from rotary movement with respect thereto by any suitable means such, for example, as the pin 32 secured to the arm and arranged within a slotted portion 33 of the plunger. The plunger is urged into engagement with the teeth of a rack 34 secured to the upright 13 in any suitable manner as by the bolts 35. When locked in engagement with the rack, the detent is urged by the spring 36 such that the inward movement thereof is arrested by a shoulder 37 on the knob 38 abutting the end of the boss formed on the arm substantially as shown. This detent and rack arrangement is employed to lock the carriage at the extreme upper limit of its travel. The groove in each of the vertical supports comprises a vertical portion 39 and a tilted or inclined portion 41 connected thereto by an arcuate section 42, the tilted portion 41 preferably extending upwardly somewhat higher than the vertical portion 39.

There is also provided on at least one of the vertical supports, a series of bores 43 adapted to receive a locking member 44, the bores being arranged in a vertical line such that the locking member 44 when inserted into a selected bore provides a means for locking the carriage in an initial position selectively in accordance with the particular bore into which the locking member has been inserted. The locking member may be of any type suitable for the purpose but preferably provided with a handle 45 whereby the member may be quickly withdrawn from a bore thereby instantly releasing the carriage from an initial locked position thereof.

In operation the object to be tested is secured to the platform member 19 in any suitable manner and the carriage is raised and locked by the member 44 by insertion of the locking member into a selected bore. It will be understood that the shock to be applied to the object under test will vary with the distance of vertical travel of the test carriage from the initial locked position until the arms 22 at the outer ends thereof are brought into contact with the lowermost portion of the arcuate section 42 of the tracks. Each of the bores 43, therefore, corresponds to a predetermined force of different strengths applied to the object under test as the testing machine goes through a cycle of operation. If desired, this information relative to the strength of such forces may be inscribed or otherwise placed opposite each of the bores by suitable indicia, for example, such indicia respectively corresponding to the height of the drop and which, if desired, may be indicative of the force of deceleration applied to the object under test without the necessity for interpolation, extrapolation or other intermediary calculations.

Figure 2:
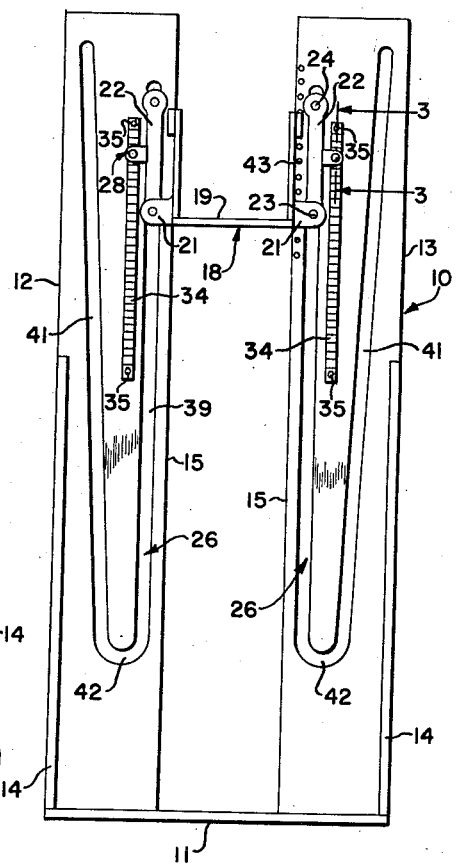
Fig. 2 is an elevational view of the device of Fig. 1 with the parts in position at the completion of the test.

Upon removal of the locking member 44 the carriage and test object start to move downward and the arms 22 start to move rotatively about their bearings 23 from an oblique angle position such as shown on Fig. 1 by reason of the downward movement of the rollers 25 within the tilted portion 41 of the slots. The velocity of the carriage during downward movement increases in accordance with Newton's law of gravitation $[V=at]$ until the roller engages the arcuate section 42 of the slot. When this occurs the arms are forced rapidly and suddenly toward the carriage, effectively arresting downward movement thereof at the bottom of the arcuate portion 42 of the slot, the inertia of the arms effectively retarding such movement and causing them to continue to rotate toward the carriage as the carriage rebounds until the arms are vertical as shown on Fig. 2. During travel of the roller along the arcuate portion of the slot some but not all of the kinetic energy of the carriage and object is dissipated, sufficient energy remaining, however, to cause the carriage to rebound upwardly with the rollers 25 within the vertical portion 26 of the slot. The carriage comes to rest at the limit of its upward travel and the detents 28 cooperate with their respective racks to latch the carriage in this position and prevent a second shock. The detent 28 performs no useful function during the downward stroke of the apparatus for the reason that the roller 25 is disposed at this time within the inclined portion 41 of the slot and the detent, therefore, is out of alinement with the rack.

In the device of the instant invention, the inertia of the linkage arms due to the weight thereof is employed to effectively and suddenly retard downward movement of the carriage as the arms engage the arcuate portion 42 of the tracks. Let it be assumed, by way of example, that the weight of the carriage and load is 100 pounds, the weight of the arms is 10 pounds and the height of the carriage drop is 48 inches. Applicants have found that the acceleration in G units in the assumed example applied to the carriage of the device disclosed herein would be 13.8 and for different weights of arms such as 50, 100 and 400 pounds, the acceleration in G units would be 33.0, 38.6 and 41.2 respectively. The acceleration in G units applied to the carriage thus may be varied at will by a factor in excess of 3.0 by a mere change in the mass of the arms or linkages 22.

When the test has been completed the machine is reset by disengaging the detents from the racks, lowering the carriage to the bottom of its stroke and raising the carriage with the rollers in engagement with the inclined portion 41 of the slot to an initial position at which the carriage is locked by the locking member 44.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A drop testing machine comprising, in combination, a platform for supporting an object to be tested, a guide frame for said platform, means for releasing the platform when raised to permit it to fall freely, a pair of arms pivotally secured to opposite portions of said platform for arresting the platform at the end of the downward movement thereof, each of said arms having a roller pivotally secured to the outer end thereof, means in said frame forming a bifurcated groove within which said roller is arranged, said groove comprising two upstanding portions and an arcuate portion interconnecting the lower extremities of said upstanding portions, said upstanding portions being inclined with respect to each other whereby rotary movement is imparted to the arm during downward movement of the platform, ratchet means on said frame, and a detent on said arms for cooperation with said ratchet to lock the platform at the upper limit of travel thereof after the roller has traversed said arcuate portion of the groove.

2. A drop testing machine comprising, in combination, a carrier for supporting an object to be tested, a frame having a pair of upstanding guide members for said carrier whereby the carrier is adapted for reciprocal vertical movement with respect to said frame, means for releasably locking said carrier selectively at different positions along said guide members when raised with respect thereto, a plurality of arms pivoted to said carrier for applying a decelerating force thereto, a plurality of bifurcated tracks in said upright members within which the outer ends of the arms are slidably arranged, a portion of said tracks being disposed generally parallel to the direction of movement of the carrier and with the arcuate portion thereof lowermost whereby the outer ends of the arms are quickly and suddenly moved toward the carrier and downward movement of the carrier is arrested thereby as the outer ends of the arms engage said arcuate portion and the arms continue to move toward said carrier as the carrier starts upwardly upon rebound, and means on said arms for locking the carrier when the carrier has reached the upper limit of travel on rebound.

3. A drop testing machine of the character disclosed comprising, in combination, a movable carriage, means on said machine for guiding the carriage for vertical reciprocal movement thereof, a pair of rigid inertial members pivotally secured to said carriage, a pair of upstanding U-shaped tracks on said machine within which the outer ends of said rigid members are respectively and slidably arranged, each of said tracks comprising a vertical slot and an inclined slot and an arcuate portion interconnecting the lower extremities of the slots, means for locking the carriage in an initial position when raised and for releasing the carriage at will to permit it to fall freely, the outer end of each of said rigid members being disposed in one of said inclined slots and above the inner end thereof whereby a sudden decelerating force is applied to the carriage as the outer ends of the rigid members engage said arcuate portions at the bottom of said tracks thereby imparting quick angular movement to said members sufficient to cause the members to pivot with respect to the carriage and engage the other upstanding portion of said tracks during upward movement of the carriage, and means on at least one of said members for locking the carriage at the limit of said upward movement.

4. A shock test device comprising a base member, a pair of spaced upright members mounted on said base member, a pair of U-shaped slotted tracks formed in and extending substantially the full length of each of said pair of upright members, each of said tracks comprising a vertical slot and an inclined slot and an arcuate portion interconnecting the lower extremities of the slots, a movable work holding platform slidably engaged between said upright members, a pair of inertial linkage members pivotally attached at one end thereof to the sides of said platform adjacent said upright members, a pair of pulleys arranged on the other end of said linkage member respectively and engaged in each of said tracks for suddenly arresting downward movement of the platform as the pulleys engage the arcuate portion of said tracks whereby the degree of shock is dependent upon the weight and its distribution in said linkage members, the length of said linkage members, and displacement of the longitudinal axis of said linkage members from the vertical when said platform is suspended at its lowest point of travel, the weight of the platform, the height of the drop, the type of curve of said arcuate portion of the U-shaped tracks, and the radius of curvature of said curve.

References Cited in the file of this patent

UNITED STATES PATENTS

| | | |
|---|---|---|
| 1,583,109 | Banschbach | May 4, 1926 |
| 2,630,704 | Armstrong | Mar. 10, 1953 |
| 2,656,711 | Tschudi | Oct. 27, 1953 |
| 2,662,392 | Sullivan | Dec. 15, 1953 |